United States Patent

Olson et al.

Patent Number: 6,083,278
Date of Patent: Jul. 4, 2000

[54] SYSTEM AND METHOD FOR DISPLAYING AND EDITING ASSEMBLY LANGUAGE SOURCE CODES

[75] Inventors: Thomas J. Olson, Plano, Tex.; Mark R. Sadowski, Cambridge, Mass.

[73] Assignee: Texas Instruments Incorporated, Dallas, Tex.

[21] Appl. No.: 08/864,183

[22] Filed: May 28, 1997

Related U.S. Application Data

[60] Provisional application No. 60/018,517, May 28, 1996.

[51] Int. Cl.[7] ............................................... G06F 9/45
[52] U.S. Cl. ..................................................... 717/2
[58] Field of Search ................................ 395/702, 704; 717/2

[56] References Cited

U.S. PATENT DOCUMENTS

| | | | |
|---|---|---|---|
| 4,890,227 | 12/1989 | Watanabe et al. | 706/14 |
| 5,572,672 | 11/1996 | Dewitt et al. | 395/184.01 |
| 5,630,132 | 5/1997 | Allran et al. | 395/670 |

OTHER PUBLICATIONS

Schuette et al. Exploiting Insturction–Level Parallelism for Integrated Control–Flow Monitoring. IEEE Transactions on Computers, pp. 129–140, Feb. 1994.

*Primary Examiner*—Tariq R. Hafiz
*Assistant Examiner*—Wei Zhen
*Attorney, Agent, or Firm*—Robert L. Troike; Frederick J. Telecky, Jr.

[57] ABSTRACT

This application describes the Interactive PP Assembly Language Editor (IPPALE), a software tool intended to help programmers write parallel PP instructions quickly and effectively. IPPALE consists of an editor that (on command from the user) extracts the current assembly language instruction, assembles it, and displays a graphical representation of how the instruction uses the resources of the processor. This allows the programmer to see immediately whether the instruction is legal, and also whether there are idle resources that could potentially still be used. The result is that programmers can experiment with a whole set of parallel instructions without ever invoking the PP assembler. We expect this to lead to faster learning, reduced programmer frustration, and improved overall productivity.

5 Claims, 4 Drawing Sheets

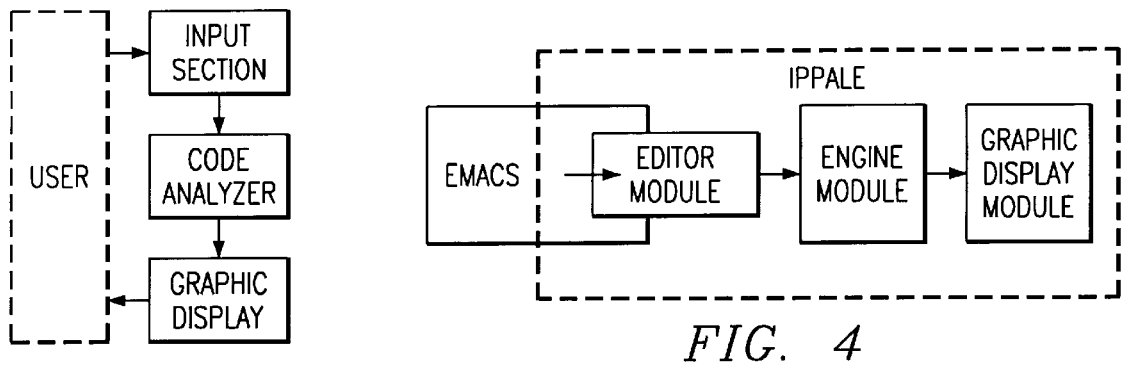
FIG. 1
FIG. 4
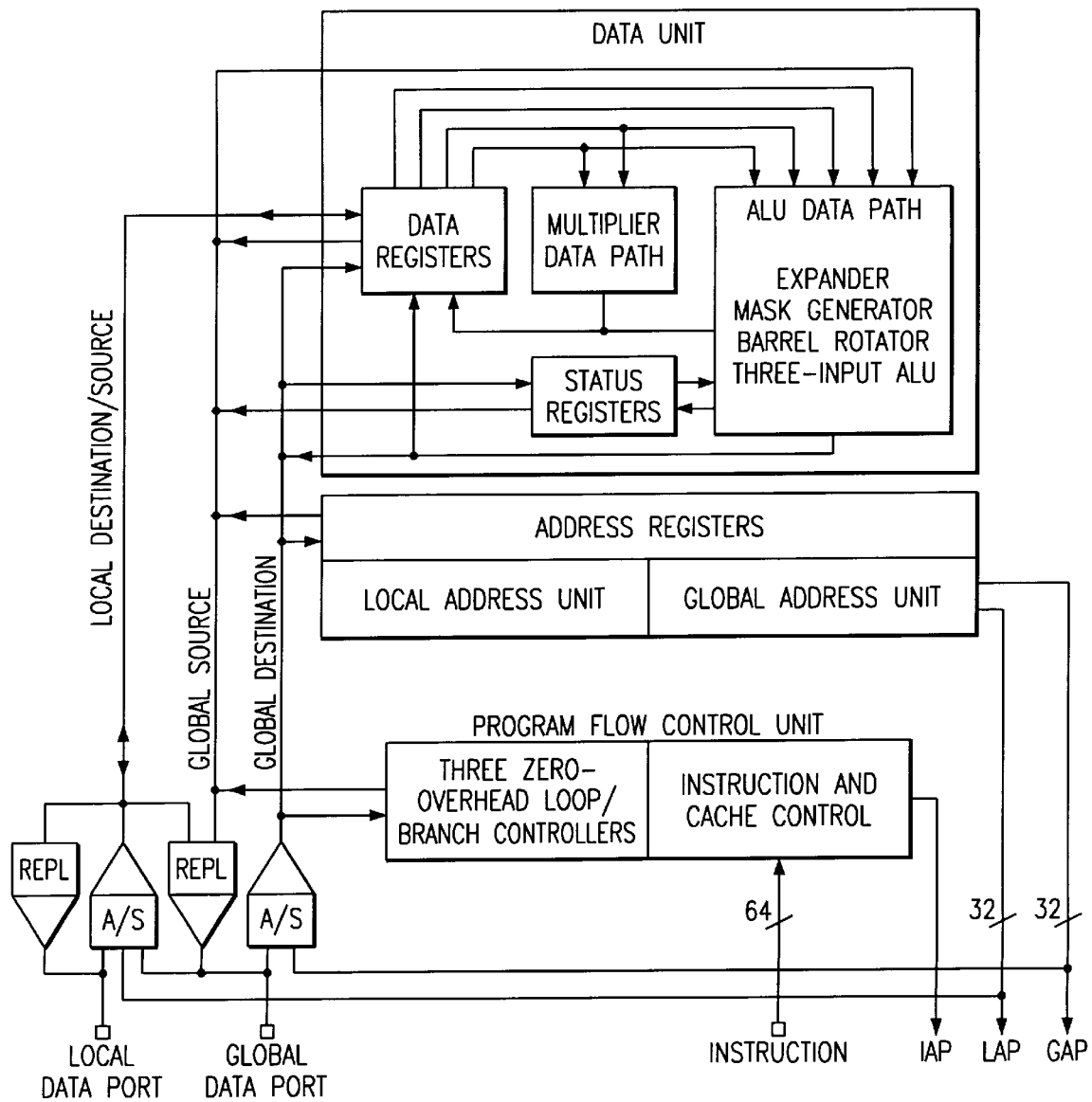
FIG. 3
IAP = INSTRUCTION ADDRESS PORT
REPL = REPLICATE HARDWARE
LAP = LOCAL ADDRESS PORT
A/S = ALIGN/SIGN EXTEND HARDWARE
GAP = GLOBAL ADDRESS PORT

SYSTEM AND METHOD FOR DISPLAYING AND EDITING ASSEMBLY LANGUAGE SOURCE CODES

This application claims priority under 35 USC § 119(e)(1) of provisional application Ser. No. 60/018,517, filed May 28, 1996.

STATEMENT OF INVENTION

This invention relates to editing assembly language source codes.

BACKGROUND OF INVENTION

In the course of creating computer programs, it is frequently useful to know the hardware implications of using a particular programming language construct. For example, if calling a particular procedure commits some physical resource of the underlying machine, that resource may not be available for use by other procedures. Programmers need to know this information in order to write correct and efficient code. In many programming systems, the programmer must rely on memory and written notes to manage this information. As systems become more and more complex, this task becomes more and more difficult.

An important instance of this problem occurs in assembly language coding for processors containing multiple functional units. An example of such a processor is the Texas Instruments TMS320C80 DSP PP processor, in which a single instruction may specify four or more separate operations. The TMS320C8x PP is an advanced fixed-point DSP processor with multiple functional units. It has a 64-bit instruction word that can encode up to four parallel operations, e.g. an ALU operations, a multiply, and two memory accesses with index modifications. It also has a three-input ALU, which gives it an unusually rich repertoire of data unit operations. This power places a significant burden on the programmer. In addition to remembering what each functional unit can do, he or she must master a complex set of rules governing which operations can be performed in parallel. This is an daunting task, and beginning programmers find writing, parallel instructions difficult and frustrating. Because of hardware constraints, not all combinations of operations constitute legal instructions. Memorizing the constraints is difficult and painful, so programmers (particularly novice or occasional programmers) have great difficulty producing correct assembly language source files.

A few tools for parallel programming include methods of providing feedback to the programmer about the performance impact of code constructs. The ParaScope editor (K. Kennedy, et al., "Interactive Parallel Programming Using the ParaScope Edition," IEEE Trans. on Parallel and Distributed Systems, V.2, No. 3 pp. 329–341, July 1991.) from Rice University is the example that is closest to our invention. ParaScope consists of a source code browser connected to a compiler for a parallel dialect of Fortran. On command from the user, it compiles the program and identifies aspects of the code that affect its suitability for parallel execution, such as loop-carried data dependencies. It displays these using color coding and arrows drawn between lines of source code. ParaScope can only be used after the entire program is written. This requirement follows from the fact that it displays information that can only be determined by compiling the entire program. In addition, ParaScope does not provide any way to display resource utilization.

For the specific problem of assembly language coding, resource conflicts are typically documented in the processor language manual. See the TMS320C80 PP programmer's manual for an example.(TMS320C8x(MVP) Online Reference release (CD ROM) of Texas Instruments Incorporated, Dallas, Tex. 1995) The problem with this is that the rules are complex and difficult for the programmer to remember while coding. As a result, programmers often produce code that violates the rules, i.e. contains resource conflicts. These conflicts are eventually detected when the programmer runs the assembler to translate the source code into object code. At that point the programmer must find the corresponding lines of source code and try to determine what is wrong by reading the manual and error messages. However, the long delay between generating an erroneous instruction and detecting it makes program development tedious and frustrating.

Error messages from language translators (compilers and assemblers) are the standard method of describing resource conflicts in the source code. They invariably appear as text messages and are informative to varying degrees.

Integrated programming environments (e.g., Visual C++, Microsoft Visual C++ 4.1, software Microsoft, Inc. Redmond, 1995) have features that address some of the problems described here. These systems typically integrate the source code editor with the language translator. The translator can be invoked from within the editor; when an error is detected, the editor cursor can jump to the line containing the error. This reduces the delay between error generation and correction. However, no efforts can be detected until the user attempts to translate the entire source file. Also, integrated programming systems do not address resource conflicts.

The programming tool that is (to our knowledge) most similar to our invention, to follow is the program editor for the Aspex PIPE (Kent, et al., "PIPE, Piplined Image Processing Engine," Journal of Parallel and Distributed Computing 2, 1985, pp. 50–78.) image processor. The PIPE was controlled by 256-bit microcode words specifying multiple operations, so it was subject to the programming problem addressed by the present invention. ASPEX provided a programming tool allowing the programmer to create assembly language instructions by interacting with a block diagram of the processor. For example, to express the addition of two data items, the programmer would use a mouse to make multiplexor connections that routed the data from its registers to the ALU and from the ALU back to registers. The ALU operation would then be set by selecting "add" from a menu. These mouse operations would translate directly into values for the fields of the microcode word. The advantage of this system was that it was impossible to create resource conflicts: every resource was visible, and assigning it to one task necessarily took it away from another task.

The ASPEX PIPE tool has the following disadvantages. First, it only applies to processors that are simple enough to lay out and manipulate on a workstation screen. Second, it provides no obvious way to express conflicts that are due to limited instruction bandwidth. In the case of the TMS320C80, for example, some conflicts occur not because there are not enough functional units to do a pair of operations, but rather because the instruction word does not contain enough bits to encode both operations simultaneously. Finally, the ASPEX system requires the programmer to be more specific than necessary. For example, if there are multiple ways to perform a given operation, the ASPEX system requires the programmer to choose one. The wrong choice may interfere with other operations that could be performed in parallel.

SUMMARY OF THE INVENTION

In accordance with one embodiment of the present invention, there is provided an interactive graphical tool that runs on some form of computer workstation. The tool analyzes and displays the resource requirements of code fragments extracted from computer programs.

The present invention can be used during program construction because the analysis is localized. The analysis is also extremely fast since it is localized. The present invention also works with partial programs.

These and other features of the invention that will be apparent to those skilled in the art from the following detailed description of the invention, taken together with the accompanying drawings.

IN THE DRAWINGS

FIG. 1 is a block diagram of the present invention when program fragments are captured by the input section and passed to the code analyzer which determines the resource requirements and the results are displayed on the graphical display;

FIG. 3 is a block diagram of the Parallel Processor;

FIG. 4 is an overall block diagram of IPPACE system;

DESCRIPTION OF THE INVENTION

Figure 2:
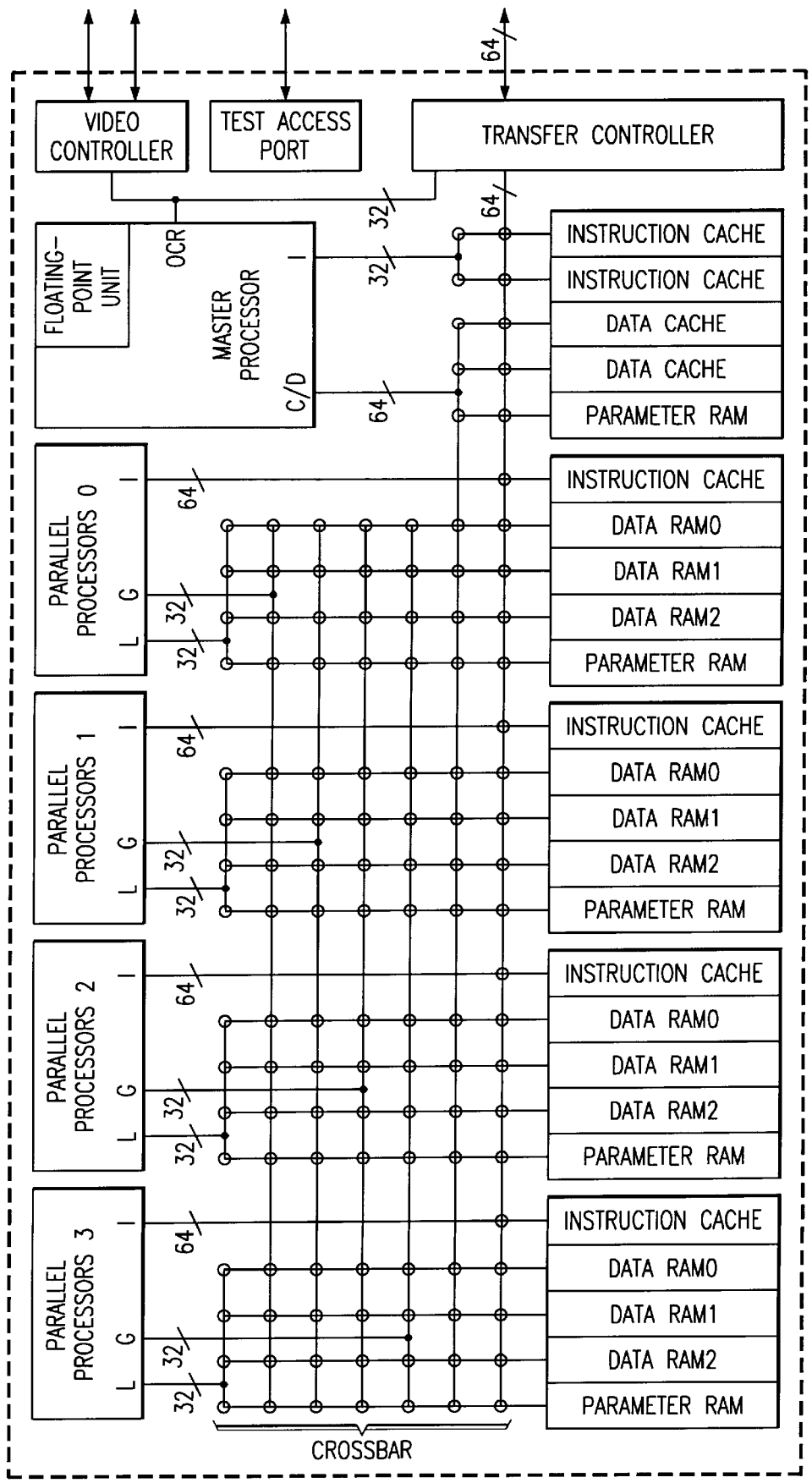
FIG. 2 is a clock diagram, of the TMS320C80.

The invention consists of an interactive graphical tool that runs on some form of computer workstation. The basic function of the tool is to analyze and display the resource requirements of code fragments extracted from computer programs. The invention comprises three components, illustrated in FIG. 1.

The input section captures the code fragment to be analyzed and submits it to the analyzer. The code fragment might consist of an assembly language instruction, a statement or procedure in C or some other programming language, or a graphical representation of a computation. In the simplest case, the input section might consist of a window into which the user can enter text using the keyboard and mouse. Alternatively (as in the instantiation described below), it might consist of an editor that understands the syntax of the programming language in question. The editor can parse the language and extract the appropriate fragment (e.g. a single assembly language instruction) automatically.

The code analyzer determines the resource needs of the code fragment it receives from the input section. Typically this involves compiling or assembling the instruction, perhaps making reference to the rest of the program or to a description of the hardware. The result is an elaborated code fragment in which portions of the code are annotated with the resources they use. In some cases the annotations may include alternatives; for example, if some part of an assembly language instruction can be encoded in several ways, there may be several lists of resources in the annotation record.

The result of the analysis phase is sent to the graphical display component of the system, which presents it to the user on the workstation screen. The display may take any of several forms. For example, it might represent each discrete resource by a graphical icon, and use color coding to indicate whether it is unused, used once, used more than once (i.e. in contention), or in some other state that is relevant to the programming problem.

The benefit of the system is that after creating a code fragment, the programmer can immediately see how the code fragment uses the resources of the target computer. If there are resource conflicts, they can be fixed before the programmer goes on to other parts of the program. If the fragment does not fully use the machine resources, the programmer can seek other, more efficient ways of performing the task.

The invention has been demonstrated in the form of an editor for TMS320C80 assembly language.

The TMS320C8x is a new line of Digital Signal Processors offered by Texas Instruments. This family of processors currently includes the C80 and C82. Both of these processors are single-chip multiprocessor DSP solutions. C8x family devices have one 64 bit RISC Master Processor and up to four 32 bit Parallel Processors(PPs). Each of the PPs in a C8x device is comparable in computational power to the most advanced single-chip fixed-point digital signal processors available today. Some of the features of the PPs of the C8x include: 3 stage pipeline, 64 bit instruction word which can support up to four parallel operations (the equivalent of up to 10 RISC-like operations) in a single cycle, splittable single cycle multiplier, splittable three-input ALU, 32-bit barrel rotator, mask generator, bit detection logic, conditional operations, and two addressing units.

Because of the complexity of the PP and the large set of instructions that it can perform, a traditional mnemonic assembly is not feasible. Instead, the PP is programmed using an algebraic assembly language. Although this algebraic assembly language makes the code much more readable, it also hides many of the restrictions imposed by the architecture of the processor. The fact that the language hides many of these restrictions makes the PP more difficult to program than many other processors.

This application describes the design and implementation of a tool that is to be used while writing assembly language code for the C8x PP. The purpose of the tool is to help the programmer understand better what is actually happening within the hardware of the processor. The tool has been named the Interactive PP Assembly Language Editor (IPPALE). The next section of this application, presents a brief overview of the architecture of the C8x, followed by a more detailed description of the architecture of the Parallel Processor, and then explains the reasons behind creating an assembly language tool. This is followed by the design and implementation of the tool, a brief description of what it is like to use the tool, and finally some observations about the scope of this project and how to improve the current implementation.

The TMS320C8x series of digital signal processors currently consists of two products, the C80 and the C82. Both the C80 and C82 are single-chip multiprocessor digital signal processing systems. They both contain one 64 bit RISC Master Processor. The C80 contains four 32 bit Parallel Processors(PPs) and 50 kilobytes of on-chip RAM, while the C82 contains two PPs and 44 kilobytes of on-chip RAM. Both processors also contain a very fast crossbar which potentially allows all of the processors to access data simultaneously and a Transfer Controller(TC) that takes care of all off-chip memory accesses. A block diagram of the C80 can be seen in FIG. 2.

Programming the C8x involves four basic tasks. Three of the four tasks are done using the Master Processor. These tasks are to setup and initialize the Parallel Processors, to setup and initialize the Transfer Controller, and to manage the Parallel Processors during their execution. The MP is generally programmed in C. Setting up the PPs requires loading a starting address for the code to be executed into the correct register for each PP. Then the Master Processor can send a signal to the PPs to make them start executing. The Transfer Controller can be set up by either one of the PPs or by the MP. In order to speed up operation, the MP is generally used to set up the TC. The MP typically manages the PPs and the TC during operation with the help of the Multitasking Executive or some other lightweight operating system.

The last of the four tasks involved with programming the C8x is programming the Parallel Processors. Of the four tasks, this is usually the most difficult and time-consuming. This is due in part to the fact that each C8x series chip has Multiple Parallel Processors (which can be executing different code), and in part due to the fact that the PP is very complex. Although programming the PP can be done in C, it is almost always done in assembly language for efficiency. It is the task of programming a single PP that IPPALE is designed to assist.

Each PP of the C80 or C82 consists of four major functional units. The Data Unit(DU) performs most of the computational work within the Parallel Processor. It contains a 16 bit multiplier (which is splittable into two 8 bit multipliers), a barrel rotator, bit detection logic, a mask generator, an expander, and a three-input ALU. The Local Addressing Unit(LAU) performs addressing operations using the local data port(the L port in FIG. 2). It contains an ALU, a scaling unit for address calculation, and hardware for field extraction. The Global Addressing Unit(GAU) performs addressing operations through the global data port(the G port in FIG. 2). It also contains an ALU, a scaling unit for address computation, and hardware for field extraction and replication. The Program Flow Control Unit(PFCU) is the last major functional unit within the Parallel Processor. The PFCU controls the execution of instructions within the PP. It controls the three levels of zero-overhead looping, the instruction cache controller, and the registers that contain the current instruction in each stage of the pipeline. A block diagram of the PP is shown in FIG. 3.

The C80 PP is an exceptionally difficult compiler target, due to the richness and complexity of its instruction set. In addition to the standard, or base set, of ALU operations, the PP offers a set of extended ALU(EALU) instructions. These instructions use information stored in a register(d0) to increase the effective instruction word length from 64 bits to 96 bits. With this 96 bit instruction word, each PP can execute one of over 4000 distinct ALU instructions in parallel with one of 16 types of multiply instructions in parallel with one of 180 addressing unit operations by the local addressing unit in parallel with one of over 200 addressing unit operations by the global addressing unit. Current compiler technology is not able to exploit this instruction set as well as human programmers. Because execution speed is critical in most applications for digital signal processors, most programmers choose to program the PP in assembly language.

The assembly language for the PP is different from the assembly language for most other processors. Rather than using a standard mnemonic assembly language, the PP uses an algebraic assembly language. Because of the large set of possible instructions, mostly in the three input ALU, a mnemonic assembly language would have needed literally thousands of distinct operation symbols. This would have led to extremely long operation symbols, unreadable code, and a very long learning period for beginning programmers. Instead, the C80 programming toolkit provides an algebraic assembler. Some examples of legal commands for this assembler are:

```
d1 = (d1 & d3) + (d2 & d3)    ; An ALU operation
* (a1 + x2) = d4              ; An indexed store operation
call = [nz] main              ; A conditional subroutine call
```

More examples of legal algebraic commands and a more complete description of the algebraic assembly language can be found in the TMS320C80 (MVP) Parallel Processor User's Guide.

Although a comparison between legal mnemonic assembly language code and legal algebraic assembly language code shows that the algebraic code is more readable and requires less memorization, there are disadvantages to algebraic languages. The main disadvantage comes from the reduced amount of structure built into the language. It is easy to determine legal operations in a mnemonic assembly language. If a symbol for the operation type exists, then it is a legal operation. The user doesn't need to understand the intricacies of the hardware so long as they accept the fact that the list of instruction mnemonics are the only legal instructions that can be executed. Understanding the possibilities and limitations of the processor consists solely of memorizing all of the legal operation symbols.

In an algebraic assembly language, however, there are an infinite number of commands that conform to the lexical and syntactic rules of algebraic expression. For various reasons, not all of these instructions are legal as PP instructions, however. For example, the following command is not a legal PP instruction:

$$d1\ d1\ +d2+d3$$

Although the PP does contain a three input ALU, the only legal operations are of the form:

$$dst=A\&\ f1(B,C)+f2(B,C)[+1]+cin]$$

where A, B., & C are inputs to the three ports of the ALU and f1 & f2 are boolean combinations of B and C.

There is nothing within the structure of an algebraic language that makes this true. Only the, hardware creates this constraint. Constraints like this appear for many reasons and in many ways in the PP of the C8x series of DSPs. Some of these constraints are due to the lack of enough instruction word bits to completely specify four different parallel operations. Some come from limitations in the number of data paths in the PP. Some come from the limited repertoire of operations of the PP ALU.

These differences between what seems, legal and what is legal come from using a previously existing, virtually unlimited language to describe a limited set of possible instructions. In order for the programmer to use this language, he or she must memorize a list of rules concerning what types of operations can be done, what combinations of these operations are allowed, and how they are represented in the language. Conventional assembly languages generally use a limited number of mnemonic symbols to encompass all or most of the above rules. Representation, or the list of symbols, then becomes the only rule the programmer needs to learn.

The initial motivation for the IPPALE project came from the observation that there was a long loop required by the programmer to determine the legality of an instruction. The programmer would have to enter the instruction using an editor, save the file, run the PP assembler on the file, and then determine from the output of the assembler whether or not the instruction was legal. If the programmer then wanted to change the instruction to have it do more, the entire process had to be repeated.

The overall goals of the IPPALE project were to help facilitate learning to program the PP, and to provide additional insight to experienced programmers that reduces the amount of work they must do in order to create efficient code. This was broken down into five more specific functions that IPPALE should perform.

First, IPPALE should display, in an quickly understandable representation, exactly what the current instruction is doing or what resources it is using, It should do this quickly because the programmer will be using this while programming. In order for the programmer to remain efficient, the most relevant information should be available with a short glance. This function serves to teach the novice programmer what resources each type of instruction uses, as well as verify to the experienced programmer that the correct operation was interpreted.

Second, IPPALE should display what the current instruction could still do. This includes both additional operations that can be done in parallel as well as additional features or functional blocks that can be used in combination with what is already being used. This helps teach novice programmers what combinations can be used together. It also means that experienced programmers don't have to spend as much time looking through reference tables and charts to try to find less familiar legal combinations.

IPPALE should also display any special warnings or concerns that the programmer might want to be aware of regarding the current instruction. Examples of these warnings include pipeline timing issues and advising the programmer of which parts of conditional commands may not be conditional. This function is much more useful to the novice PP programmer than an experienced one and the display of this information is de-emphasized accordingly.

Another major function of IPPALE is to assist the programmer in determining why an illegal instruction is illegal and what could be done to make it legal. This would include dealing with both illegal instructions and illegal combinations of legal instructions. The ideal form that this function could take would be to display a text explanation of why an instruction is illegal for any illegal instruction that is entered. A less aggressive form that this goal could take would be to somehow draw the programmers attention to certain aspects of the instruction that may be causing the error. It would then be up to the programmer to use these hints to determine exactly why the instruction is illegal.

The last specific goal that IPPALE must perform is that it should not interfere with or inhibit the programmer in any way. Using this tool should not require any more effort than using a simple editor. There are several implications to this. If IPPALE were to crash, the programmer should not lose the code that had been written. Also, the programmer should never have to wait for the tool while writing code. IPPALE should also not be distracting to the programmer. Although the novice programmer may accept some of these conditions in order to become more familiar with the PP, the slightly more experienced programmer would cease to use a tool that interferes with his/her productivity. If this tool is to be used by experienced programmers, it cannot be a nuisance in any way.

The overall system design of IPPALE was dominated by the constraint that IPPALE should not interfere with the programmer. In order to accomplish this, it was decided that the editor and the rest of IPPALE would be two separate processes with minimal communication. This allows the user to use the editor as fast as possible without worrying about the rest of IPPALE. Since they are separate processes, the rest of IPPALE is executed in parallel with the editor and does not necessarily have to keep up with it.

In order to make IPPALE easy to maintain and upgrade, it was further broken down into three main modules as shown in FIG. 4. These modules make it easier to upgrade one element of the system without upgrading the entire system. Breaking IPPALE into three modules also allows us to take advantage of the fact that each of the three main functions of IPPALE was best suited to a different programming language.

The Editor Module is actually embedded within a standard text editor and determines what instruction will be displayed by IPPALE. The Engine Module decomposes the algebraic assembly language text and determines, to the best of its ability, exactly what is happening within the PP during that instruction. This is then used to determine exactly what should be displayed in order to represent what is happening. The Graphic Display Module displays the information in a way that draws attention to the most important information and de-emphasizes the less important, but still useful, information.

It is important to note that the information only flows in one direction in this system. Because of this, any crash or bug in IPPALE will not affect the code that the programmer has typed into the editor. This is because there is no way for information to flow backwards and corrupt the editor.

The Editor Module serves two purposes within IPPALE. First, it provides a link between the text editor used to enter assembly language code and the rest of IPPALE. Second, it must be able to determine and send relevant information at the appropriate time. Because it was not clear exactly what information would be relevant and even less clear when the appropriate times to send information were, the editor that we chose needed to be easy modifiable. Writing a new editor from scratch would require a lot of time and resources that could better be used on the rest of IPPALE. Because of these two requirements, using Emacs as the base of the editor seemed the natural choice. The Emacs editor is actually implemented within a programming language(Emacs-LISP). Because Emacs provides an interface with the code which controls the editor, making changes to the Emacs editor is relatively simple.

The E-LISP code written to modify Emacs consists of two major parts of code. The first group of functions make it possible to create, terminate, and send information to a separate process which will be IPPALE. This is accomplished using the library of E-LISP functions for asynchronous processes. These are processes which are started by Emacs itself and run independently from, and in parallel with, the Emacs process.

The second group of functions tries to fulfill the goal of sending relevant information. Since a parallel instruction(or even a single instruction) can be spread over several lines, this code must determine where an instruction begins and where it ends. Also, due to the rules for communication between the Editor Module and the Engine Module described below, a line of assembly language code that is sent to the Engine Module cannot have a comment anywhere within it(unless it is at the very end of the instruction). (This comes from the fact that an instruction going into the Engine Module is sent on a single line and the terminating symbol for comments for the PP is a newline character.) Finally, while checking for and removing comments, the Editor Module also compresses whitespace in order to reduce the amount of unnecessary communication between modules.

Currently the Editor Module does not attempt to determine when it is appropriate to send information. Instead, the code that extracts and sends a legal instruction is bound to a key sequence. It is the user's responsibility to determine when information should be sent.

The Engine Module serves as the heart of IPPALE and includes more than 75 percent of the code. There were two basic approaches that could be taken to create this assembly language "interpreter." The first approach was to "create a parsing engine" that could apply all of the rules governing the algebraic assembly language of the PP. The second approach was to use assembler/interpreter techniques to transform the code into the actual instruction bits and then display the information using the opcode. The advantage to the second approach is that many of the conflicts in parallel programming of the PP come from not having enough bits in the instruction word. If a legal opcode can be created from an instruction, then there are no conflicts in it.

In order to ensure compatibility between what IPPALE says is legal and what the TI PP assembler says is legal, we decided to use the source code for the actual assembler, ppasm, to create the Engine Module. Several modifications were needed in order to make ppasm work more like an interpreter. Some of these modifications include: make ppasm use standard input rather than read a file (which means it can only look at any particular data once), make ppasm determine all possible ways of encoding instructions rather than only finding the first legal one, make ppasm do as much of the encoding as it can on illegal instructions rather than quitting after the first error, and make ppasm deal with undefined symbols/labels in an intelligent manner.

This modified assembler attempts to encode each part of each instruction in every way possible. After each encoding, the encoded information is passed to a new group of functions built into the assembler. These functions keep track of resource usage information and update the information with each new encoding possibility received. In order to do this, the functions keep two copies of resource attribute lists. The first copy is used to combine all of the possible encodings for a single parallel part of an instruction. The second copy is used to combine all of the results from each of the parallel parts of the instruction.

A resource list is updated by creating a list for the particular encoding being added and then merging that list with the current list. In order to merge the lists, a finite state automaton is used. For the FSA, the state names represent the attributes of the resources.

When all of the parts of an instruction have been encoded, this code sends the attribute lists, as well as some other information, to the Graphic Display Module. Then, all of the lists are cleared and readied for the next instruction.

At a high level, the Graphic Display Module's job is very easy. In essence, the Engine Module tells the graphic display, "Print the assembly instruction blah . . . Color the Multiplier Resource blah . . . Color the ALU Resource blah . . . and so on . . ." In order to reduce the amount of communication, however, the resource being described is determined by a particular location in a string. Each character represents an attribute which is mapped to a color for its corresponding resource.

The Graphic Display Module basically consists of one main loop that is continually executed until IPPALE terminates. This main loop checks to see if there is input waiting to be read. As long as there is input waiting, nothing will occur other than reading the input. As each line is read, it is stored in a variable for the block that it will display it. Once there is nothing left to read, all of the blocks are updated with the new information that had been stored and the screen is updated. This means that the user can send information to the Graphic Display Module at a very fast rate, and even if the Graphic Module can't keep up, it will always print the most recent information when a break does occur. This prevents the user from having to wait for every intermediate screen to be displayed.

All of the display routines are implemented using the tkinter module in the Python programming language. This module of Python provides an object-oriented interface to the Tk toolkit. For more information please refer to *An Introduction to Python for UNIX/C Programmers,* Guido van Rossum, CWI, Amsterdam, 1993.

Although using a different programming language for each of the three modules eases the implementation of each module, one aspect that is made more difficult is the interface between the modules. For IPPALE, the UNIX(POSIX) pipe is the primary means of communication. In order to use this type of communication, we needed to establish some rules for communication. This section describes the rules for communication between the three different Modules.

The communication between the Editor Module and the Engine Module is very simple. The Editor Module must be able to send the current assembly language instruction to the Engine Module. Only one communication rule was needed between these two modules. Each complete instruction, including all of the parallel parts, must be sent on a single line. In other words, a newline character is the termination symbol for the current instruction.

Between the Engine Module and the Graphic Display Module, the rules are more complex. Each line contains one string that is to be displayed by the Graphic Display Module. The string may either contain text that is to be displayed or it may represent a list of attributes for the resources within one block. The first two characters determine which block the information is for. If the first two characters do not correspond to one of the four defined sequences, I then the string is interpreted as a message. This allows all of the assembler's messages to be printed in the message block without any modification to the assembler.

Each of the blocks, other than the Message Block, expects that a string that represents resource attributes will only contain the five characters that are defined to represent attributes in the Graphic Display. These characters are: 'u', 'f', 'c', 'b' and 'm.' They represent the attributes: 'used' (black), 'free' or 'available'(yellow), 'conflict'(red), 'blocked' or 'unavailable'(gray), and 'multiple possibility' (green), respectively. Finally, the Graphic Display Module expects that the input string is the correct length for the block used. This length varies, however, based on the destination block.

In order to use IPPALE the programmer must first start an Emacs session. Next, the ELISP code for the Editor Module should be loaded into Emacs. This can either be done by adding a line to the programmer's '.emacs' file, or it can be loaded manually. Once loaded, the programmer enters the command to start IPPALE. Loading and initializing IPPALE can be time consuming. It can take as long as 10 seconds on a fast machine with few other processes or as long as 30–45 seconds on a slower machine with many processes already in progress. The initialization opens a new window which has several different ways of looking at the execution of the current instruction.

Once started, the programmer can, at any time, send the instruction that includes the cursor to IPPALE. Currently, sending the instruction is done by entering a command-key sequence to Emacs. After entering the sequence, the IPPALE display is updated. The display is usually updated within 1–2 seconds on a relatively fast machine. Some example display screens are shown in FIG. 5.

The IPPALE window has 5 different display blocks. Each block presents a different way of looking at the instruction. The first block, the Assembly Language Instruction Block, displays the instruction that was sent to the Engine Module of IPPALE. This window can be used to verify that the instruction received is the intended instruction. For example, this block would help a programmer determine that the parallel symbol, "II," was accidentally left out of an instruction.

The second block is one of the most important. It is the Resource Usage Block. It displays all of the data paths and functional units within the PP. Each of these resources is given a color to designate how it is being used in the current instruction. There are five colors or attributes: black signifies that one and only one of the parallel instructions requires the resource in order to execute, yellow means that the resource can be used in addition to those resources that are already used, green means that there is more than one way to encode the current instruction and that the resource is used in at least one, but not all, of the different encodings, gray means that the resource cannot be used unless at least one of the currently used resources is freed, and red means that the resource is trying to be used by more than one parallel instruction words, red means that more than one part of a parallel instruction is trying to use the resource.

Figure 5A:
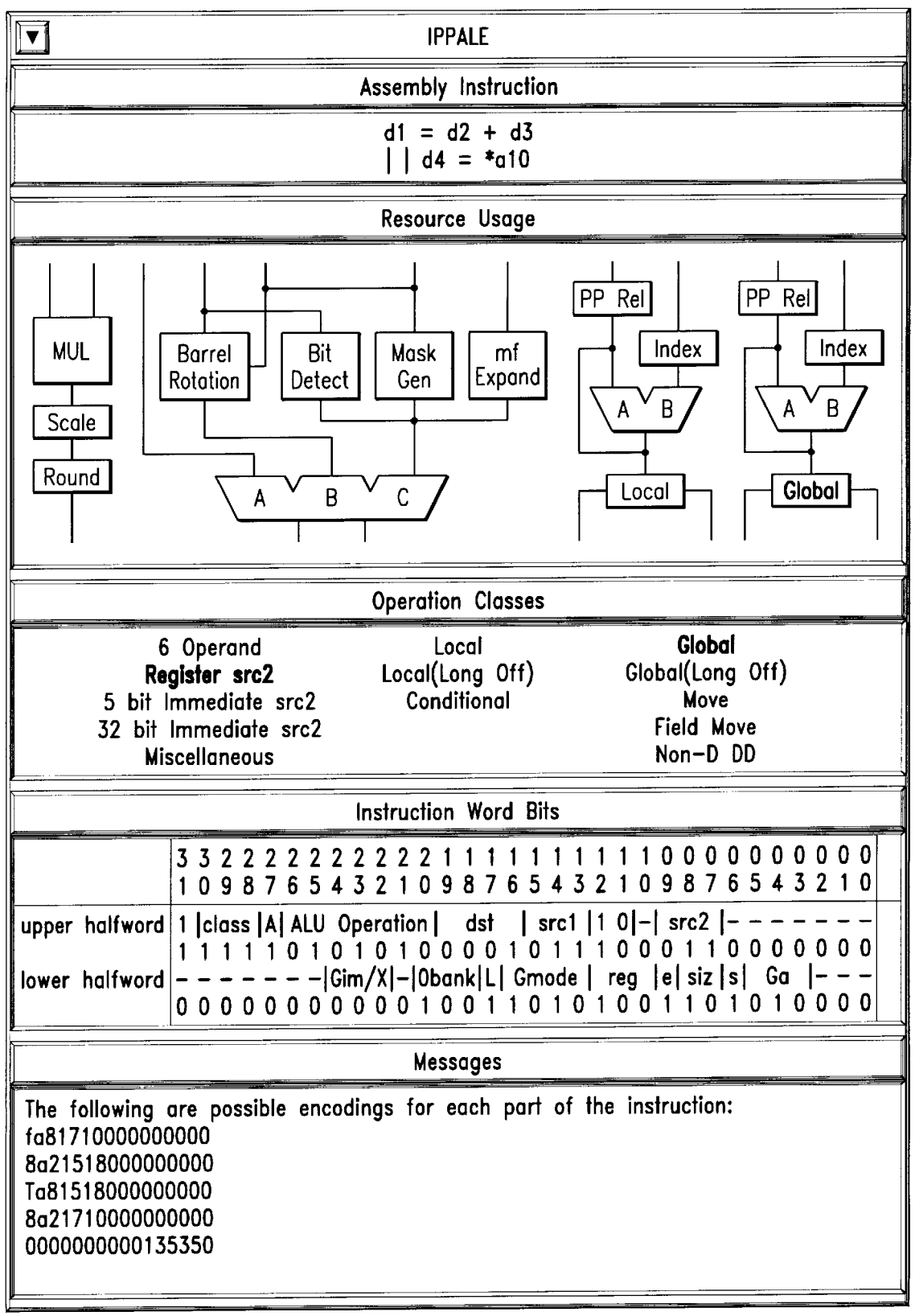
FIG. 5a is a standard legal assembly language instruction.

FIG. 5a. shows an instruction which consists of 2 parallel parts. The first part can be encoding one of four different ways. Some of the resources in the Data Unit are colored green to show that they may be used depending on the encoding. The ALU, however, is black. All three of the different ways of encoding the instruction require the ALU, therefore, no matter which encoding is chosen, the ALU will be used. The second part of the instruction only has one possible encoding. The resources needed can be seen in the Global Addressing Unit portion of the PP. In addition, some of the unused resources are, colored gray because they cannot be used with all of the other resources being used, while others are yellow because they could be used with the current resources.

Figure 5B:
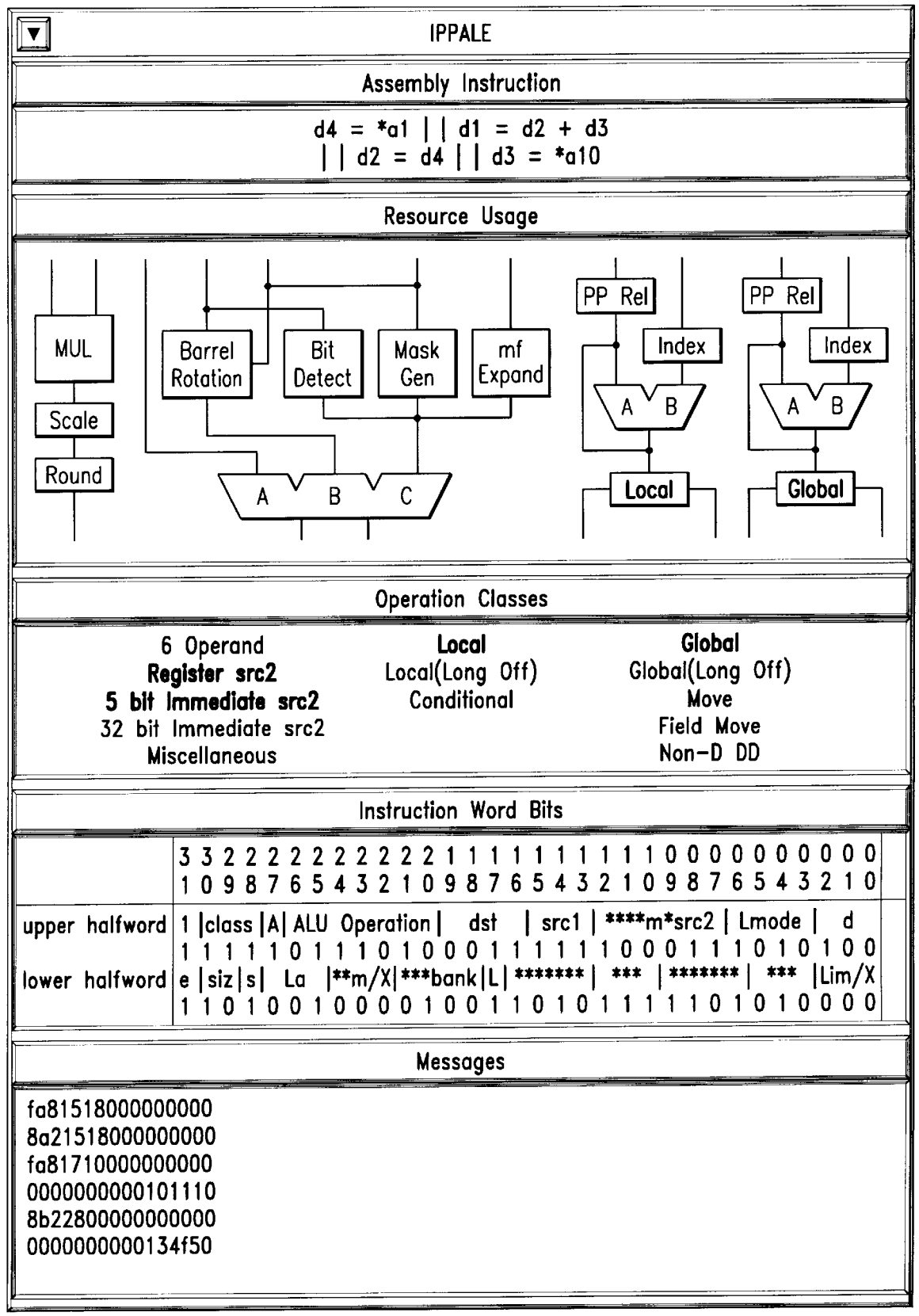
FIG. 5b is an illegal combination of (legal) assembly language instructions.

In FIG. 5b., however, you see that there are four parallel parts to the instruction. The first part of the instruction can only be encoded in one way. The resources it requires are in the Local Addressing Unit portion of the PP. Similarly, the second and forth parts of the parallel instruction can only be encoded using the Data Unit and Global Addressing Unit respectively. The third part, however, can be encoded using either the Data Unit or the Global addressing unit. Since both of these resources are already used, there is a conflict. The conflicting resources, the Data Unit and the Global Addressing Units are colored red. This instruction cannot be encoded as a single instruction for the PP.

The third block of the Graphic Display Module, the Class Block, displays the instruction information in a different form. There are 13 different instruction classes within the PP. The Local Addressing Unit can perform an operation in one of three different classes while the Global Addressing Unit and the Data Unit can each perform one of five different classes of instructions. The Class Block shows which classes are being used by each of the three computational units within the PP. Each column in the Class Block corresponds to one of the functional units within the PP. Therefore, only one class in each column can be used within a single instruction.

In FIG. 5a. you can see that each column has one or fewer classes with used attributes. Similarly, in FIG. 5b. you can see that there is a conflict within the functional units of the PP which try to use more than one class.

The fourth block, the Instruction Word Bits Block, is not very informative to the novice PP programmer. It is, however, informative to the more advanced programmer. This block allows the programmer to see all of the fields within the 64 bit instruction word. Sometimes this may reveal additional functionality that the programmer was otherwise not aware of. For example, the programmer can quickly refresh his/her memory on the maximum allowed length of immediate values. Another example is in FIG. 5a. The "siz" block can remind the programmer that loads and stores can also be done using bytes or halfwords in addition to using full 32 bit words.

The final block, the Message Block, is where all of the messages from the assembler and all of the messages from IPPALE are displayed. This block also displays each of the possible encodings for each parallel part of the instruction.

At the time of writing this paper, the first version of IPPALE had just been completed. Therefore there is very little user feedback. Most of the observations in this section are based on the author's experience with the tool.

In terms of the overall goals for the IPPALE project, IPPALE seems to do an excellent job of accelerating the learning curve for programming the Parallel Processor. It seems to provide the structure and limitations that the algebraic assembly language lack. For the more advanced Parallel Processor programmer, IPPALE is a tool that can also be of some use. Although there are modifications that would make IPPALE a more useful tool to the experienced programmer, it does do a good job of assisting the programmer as it currently is.

In terms of the functional goals of IPPALE, it does an excellent job of displaying all of the resources that are currently being used in a legal instruction. It also does an outstanding job of displaying what resources are still available in a legal instruction. Currently, IPPALE does not have a large library of warning or informational messages. It is easy to add messages, however, so this function can be improved. IPPALE does help the programmer in determining why illegal instructions are illegal, however exactly how much it helps is questionable. IPPALE also does a fairly good job of not interfering with the programmer.

One very interesting note is that IPPALE was used to find a bug in the assembler for the PP. By experimenting with IPPALE, the author saw the tool show that some resources were free that shouldn't be. The problem ended up being in the assembler source code that was used as the base of the Engine Module of IPPALE. Although it was a relatively obscure bug(It only occurred with a PP-relative load into a non-D register in parallel with a global addressing unit register move.), this suggests that a tool such as this may also be useful in debugging assemblers.

In terms of the functional goals mentioned above, there are four main areas for improvement. IPPALE does currently require more effort from the programmer than it should. This is not a severe deficiency, however it is an area for improvement. An example of this is that the programmer must currently enter a keystroke everytime an instruction should be sent. Operations like this should be automatically done by IPPALE.

Another way in which IPPALE can be a nuisance to the programmer is because it cannot be modified. Currently, the IPPALE window is relatively large. The user has no option to resize the window or remove unnecessary or uninteresting blocks. If the user were able to customize the tool, each person could create their own tool that makes them the most productive.

Also, IPPALE could have a much larger set of warnings and informational messages. These could include anything from lists of common mistakes while using certain commands to lists of possible alternatives that the user may not have thought of It is these messages that can change IPPALE from a still somewhat cryptic tool to a much more user-friendly tool.

In terms of assisting the programmer with determining why illegal instructions are illegal, IPPALE could use a lot of improvement. Although it currently demonstrates that this feature is not impossible, IPPALE does not do a very good at assisting with illegal instructions. Many times, illegal instructions even cause IPPALE to crash. Why illegal instructions are illegal can almost always be found in either the Resource Usage Block, the Class Block, or the Instruction Word Bits Block, however, the tool does not help the user figure out which Block to find it in.

Although determining why illegal instructions are illegal is a difficult task, the tool usually has information somewhere on the screen that would explain it. The tool stops short, however. With a little more effort, the tool could determine on its own more accurately what is wrong (or at least where the user should look on the current screen).

The most important, however, problem with the current tool is the fact that it is not robust enough. IPPALE would be most useful by assisting programmers in determining why an illegal instruction is illegal. Currently, however, IPPALE does not always handle legal instructions well. Although IPPALE can usually deal with illegal combinations of legal instructions, it is not nearly as good with illegal instructions. With these types of instructions, IPPALE is hindered by the fact that it is based on the assembler. Once the assembler has determined that an instruction has a syntax error (an illegal ALU operation, for example), it knows that the program no longer needs to be assembled. It knows that its job is done. It therefore does not need to continue assembling any of the other code. In IPPALE, part of this is circumvented, however, IPPALE usually interprets an instruction with a syntax error as a NOP. Therefore, it provides no useful feedback other than letting the user know that the instruction is illegal.

The following are some possible approaches to take in taking IPPALE to the next level. They include possible enhancements to the current tool, what could be done differently if the project were to start over from scratch, what extensions this tool could represent with other types of processors, and what extensions a tool such as this could represent to other programming languages.

There are several possible enhancements to the current tool. The most useful change to IPPALE would involve improving the interface through Emacs. Binding the functions to initiate and terminate IPPALE to keystrokes would make the user much more likely to use the tool. (And much more likely to restart it in the event of a crash.) Also, creating a more "intelligent" send instruction command would be very useful. This would basically involve creating something that snoops the keystrokes that are entered and automatically executes a the send instruction command for certain keystrokes (the arrow keys, "11", and the return key, for example).

The next most useful modifications would involve expanding the number of warning/informational messages that are displayed on the screen. Currently, only a few messages are displayed based on the class of the operation being performed, however, this library of messages could be expanded.

Along the same lines, a system of on-line help could be added to the IPPALE. This could display information such as more detailed information about the current instruction, or more detailed information about why the current instruction is illegal. This could also include something that allows the user to explore the different operation possibilities. An example of something like this is available in the form of cascading menus.

More difficult modifications would include allowing the user to interactively move, resize, and/or delete the different blocks in order to customize the tool to his/her own liking.

The main benefit that the author sees for starting this project over from scratch would be to better integrate the assembler with this tool. This would include redesigning the assembler to incorporate this tool. Rather than adding code that decodes the final encoded instruction to obtain resource usage information, the assembler could use part of the data structure for each instruction to contain this information. This information could be filled into the data structure as the instruction is being encoded. If implemented properly, this would allow much of the code to be reusable in assemblers for future processors. This would also allow the interactive tool to be used as a debugger for the assembler source code. By interactively entering code for the target processor, the assembler programmer could more quickly see what the assembler is trying to do with the code.

As mentioned above, a tool like this could be useful for other processors as well. This tool would be most useful for very complex processors which do not use traditional mnemonic assembly languages, but instead use a less restrictive assembly language such as the algebraic format used in the Parallel Processor of the C8x series of processors. Because the nature of the tool is to display the usage information for the specific resources of the Parallel Processor of the C80, much of the code used in the IPPALE project would have to be re-implemented for another processor. Most of the Editor Module code and much of the framework for the Graphic Display Module could be reused, however, this represents a. very small percentage of the actual code. The bulk of the code comes from the modified assembler that makes up the Engine Module.

In an academic environment, a tool like this one may prove useful as a learning aide for students learning assembly language or machine language. If the tool were extended to display the instruction bits and the Resource Block were given more detail, students could interactively learn how microprocessors work at a very low level (in terms of software). You can imagine a tool where you enter an assembly language instruction and the tool displays the 64 bit instruction word. It then activates the correct data paths for the type of instruction and the students can interactively see the internal workings of a microprocessor. This would be much more entertaining than the paper-and-pencil method used now.

The natural language for a tool like IPPALE to be used with is either assembly language or machine language. This is because each instruction in assembly or machine language code can be easily represented by a static picture of the resources within a processor. There do exist possible extensions to other programming languages, however. In C, for example, one can imagine entering a line or block of C code and using a tool similar to IPPALE to examine the results of compiling the code. The sequence of assembly language instructions can immediately be viewed in sequence, and modifications can be made to the C code to improve the performance.

The instantiation of the invention presented in the attached technical report is directed at wide-word assembly language programming, but the invention is not restricted to this problem. The same basic idea could be applied to coding in more conventional languages such as C or Fortran. Specific uses include:

1) As an optimization aid, the system might translate small portions of high-level language code into lower level code (e.g. assembly language) and present the code to the user as text. This would allow the user to assess the code efficiency by inspection, and try modifying the high-level code to see how it affects the efficiency of the low-level code.

2) The use of 1) above could be applied in the case of source-to-source translations. For example, TI produces a tool called PPCA that improves the quality of TMS320C80 assembly code by attempting to combine sequential instructions into a smaller number of parallel instructions. The effectiveness of PPCA depends in part on exactly how the original program performs the computation, so users often run PPCA repeatedly on different versions of their code. This process could be made much easier by letting PPCA perform the "code analyzer" function in our invention, and letting the display function display the analyzer's translation of the code fragment of interest.

3) If the code statically allocates resources (e.g. statically allocated memory), the system might present a graphical depiction of the memory map showing what parts of memory are associated with a given portion of code.

Other Embodiments

Although the present invention and its advantages have been described in detail, it should be understood that various changes, substitutions and alterations can be made herein without departing from the spirit and scope of the invention as defined by the appended claims.

What is claimed is:

1. A system for facilitating construction of improved assembly language source codes by providing feedback about resource usage, comprising:

an editor for providing and editing assembly language source codes;

an interactive selector for selecting, by user commands to said editor, a portion of an assembly language source code that a user is contemplating adding to a program under development consisting of one or more instructions;

a code analyzer for analyzing said one or more instructions specified by said selector mechanism to predict which physical resources of the target processor would be used by those instructions; and a display for displaying to the user an indication of the resource usage identified by the code analyzer, including any conflicts between portions of the instructions.

2. The system of claim 1, wherein the physical resources identified by the code analyzer are functional units, datapaths, and other circuit elements of a microprocessor.

3. The system of claim 1, wherein the physical resources identified by the code analyzer are fields in the instruction word of a microprocessor.

4. The system of claim 2, wherein the display consists of a rendering on a computer display device of a block diagram of the processor, and resource usage or conflict is indicated by highlighting or changing the color of the portion of the diagram corresponding to the circuit elements in use or in conflict.

5. A system for facilitating construction of improved assembly language source codes by providing feedback about resource usage, comprising:

an editor for providing and editing assembly language source codes;

an interactive selector for selecting, by user commands to said editor, a portion of an assembly language source code that a user is contemplating adding to a program under development consisting of one or more instructions;

a code analyzer for analyzing said one or more instructions specified by said selector mechanism to predict which physical resources of the target processor would be used by those instructions wherein the physical resources identified by the code analyzer are fields in the instruction word of a microprocessor; and a display for displaying to the user an indication of the resource usage identified by the code analyzer, including any conflicts between portions of the instructions, said display consists of a graphical or text depiction of the instruction word, having spaces corresponding to the bits or fields of the instruction word, resource usage is indicated by filling in the bits or fields of the word that the selected source language instruction specifies and leaving bits or fields that the selected instruction does not specify blank, and resource conflict is indicated by coloring in bits or fields that are in conflict with a designated color or symbol denoting conflict.

* * * * *